Patented July 1, 1930

1,768,710

UNITED STATES PATENT OFFICE

PERCY G. PARIS, OF BETHLEHEM, PENNSYLVANIA, ASSIGNOR TO BETHLEHEM STEEL COMPANY

UTILIZATION OF CONVERTER SLAGS FOR THE MANUFACTURE OF ALLOY STEEL

No Drawing. Application filed March 11, 1927. Serial No. 174,703.

This invention relates to a process for the manufacture of alloy steels from pig iron containing the alloying element as a constituent. It relates more especially to the production of low carbon chrome steel or chrome iron from chromiferous iron ores as a by-product of a duplex process for the production of rails and finished steel products of similar character.

Chromiferous iron ores, such as the Mayari ores of Cuba, contain variable amounts from 1 to 2% of metallic chromium in the form of chromite combined with limonite, together with smaller percentages of nickel. No suitable method has as yet been devised for separating the chromite from the iron ore, consequently when an ore of this nature is charged into the blast furnace a chromiferous pig iron is produced containing from 2% to 4% of chromium. Though chromiferous pig iron is known to possess certain advantages for the manufacture of a special grade of iron casting, the market for this product is limited, and is incapable of absorbing the tonnage available.

In order to rid this chromiferous pig iron of its contained chromium, it has been proposed to oxidize the chromium in a pneumatic converter, said converter operating in conjunction with an open hearth and forming therewith a duplex process for the manufacture of steel rails. Such a process has been fully disclosed in U. S. Patent No. 902,052. The oxidized chromium in a process of this nature, is however completely lost in the converter slag, and has not hitherto been put to practical uses.

An object of this invention is to effect a substantial recovery of the chromium in a converter slag and the subsequent alloying of the recovered chromium with steel in a manner not greatly affecting the normal operation of the known duplex process above referred to.

A further object of this invention is to produce, as a by-product of said duplex process, a low carbon chrome steel or a chrome iron having the known characteristics of high resistance to atmospheric corrosion.

A further object of this invention is to effect the reduction of the metallic oxides contained in a converter slag under the influence of a suitable reducing agent, by utilizing the residual heat of the converter and of the slag and also the heat of an exothermic reaction, without having recourse for said reduction to an electric arc furnace and the consequent introduction of carbon into the alloyed bath.

Other objects of this invention will be apparent from the following description of the process.

When a chromiferous pig iron, of the kind above referred to, is submitted to an oxidizing blow in an acid converter, there is obtained a slag containing chromic oxide, ferrous oxide, silica and manganese. The following slag analysis is typical of this operation: $Cr_2O_3$ 31.11% FeO 38.97%, $SiO_2$ 28.48% MnO 4.08%. In a Bessemer charge when 24,000 lbs. of chromiferous pig iron are blown with addition of 5000 lbs. of scrap, about 3400 lbs. of slag may be produced, containing 718 lbs. of metallic chromium corresponding to 1050 lbs. of chromic oxide. In order to recover this contained chromium, the slag may be transferred to an electric furnace, containing a previously prepared bath of low carbon steel. A suitable reducing agent, as for example a silicon alloy, may be added to the transferred slag, so as to effect the reduction of the chromium and the iron in the transferred slag, said reduced metals passing to the bath and becoming alloyed therewith in the usual manner.

It is well known that, for the purpose of refining steel and alloying it with other elements, a basic electric furnace is preferable to one having an acid lining, because of the easier control of the conditions extant in the former. In the case under consideration, however, viz, the converter slag of an acid process, the building up of the silica content would be objectionable in a basic refining furnace, and would require abundant additions of lime to render it suitable therefor. Any lime addition, for the purpose of neutralizing the acidity of the converter slag, would be additional to that required to constitute the normal lime slag of a basic furnace charge and would result in a high slag volume containing comparatively small proportions of reducible components. It is to the utilization of an acid slag of this description that this invention is more particularly directed.

In the example cited above, 3400 lbs. of slag, containing approximately 1050 lbs. of chromic oxide and 1315 lbs. of ferrous oxide, would require approximately 680 lbs. of 80% ferro silicon for their theoretical reduction. Taking into consideration the various operating losses, and depending on the slag conditions, from 1000 to 1500 lbs. of metal may be obtained, containing 500 to 600 lbs. of chromium. On this basis, in order to produce a chrome steel containing 11-12% of chromium, there will be required 3200 lbs. of iron or low carbon steel scrap to effect the necessary dilution of the chromium. In the present example the Bessemer treatment results in 25000 lbs. of blown metal substantially free of chromium, carbon and silicon, but containing .90% of phosphorus and .07% of sulphur, the content of which latter elements may be decreased in a subsequent electric furnace refining process. This blown metal is therefore suitable for use as a diluent of the chromium reduced from the slag.

The process may be carried out in the following manner. The chromium is oxidized in a converter and passes to the slag in the known manner, together with some iron and substantially all the silicon. At the completion of the "blow" the main portion of the blown metal may be poured into a weighing ladle for transfer to an open hearth furnace, or for any other suitable purpose. The remainder of the blown metal, in the quantity required for the dilution of the reduced chromium, may hovever be retained in the converter together with the slag containing the metallic oxides to be reduced. To this slag there may be added the required amount of a reducing agent, preferably pulverized 80% ferro-silicon and the amount of flux that may be required, in order to throw back the chromium and some of the iron into the bath of blown metal retained in the converter. The flux additions will depend on the condition of the slag at the end of the blow, and whether or not the silicon after-blow, described below, has been required. The available bases combine with the silica to form complex silicates, and excess silica may be satisfied with lime, so as to form calcium iron manganese silicate slag. As is well known, the oxidation of silicon by a metallic oxide is a highly exothermic reaction, therefore provided the residual temperature of the mass retained in the converter is high enough, the reduction of the metallic oxides contained in the slag may be effected without further application of heat, whereby a bath will be obtained containing approximately the desired content of chromium and substantially free from carbon and from silicon. In order to avoid loss of heat, as little time as possible should elapse between the removal of the major portion of the blown metal and the addition of ferro-silicon to the slag retained in the converter. To assist this condition, it is preferable to preheat the ferro silicon reducer before adding it to the charge retained in the converter.

In cases where the temperature drop in the converter is too great to permit initiation of the reaction with the silicon, recourse may be had to a means for supplying additional heat, such as for example an oil fired converter. If such a converter is not available, the additional initial heat required may be obtained in the following manner. After the converter has been poured to remove the major portion of the blown metal, a small quantity of ferro silicon may be added to the blown steel retained in the converter, before adding the ferro silicon or other reducing agent required for the slag reduction. A very short oxidizing "blow" is then applied to the previously blown steel to oxidize this added silicon and to develop the heat necessary to initiate the reduction of the chromium in the slag. Immediately this "after-blow" has been completed, the ferro silicon reducer may be added to the slag, the reaction between the silicon and the metallic oxides is thereby readily initiated and continues exothermically to its maximum degree. In the example I have cited, if the final temperature after pouring be 1250° C., the available heat of the charge left in the converter, viz. 3400 lbs. of slag and 3200 lbs. of metal will be 2,394,000 pound calories. In order to raise the temperature of the mass 400° C. (to 1650° C.) there will be required 340,000 additional pound calories for the slag and 256,000 pound calories for the metal, a total of 596,000 pound calories. Therefore, assuming a value of 5000 net calories per pound of silicon oxidized, it would be necessary to oxidize 119 pounds of silicon from the bath, to obtain the desired increase in the temperature. As it is not feasible in practice to completely oxidize the silicon, 175 to 200 lbs. of silicon or 250 lbs. of 80% ferro silicon should be added to the metal. It will be obvious that the ferro silicon addition to the slag, for reducing chromium, must not be made until after the oxidation of the silicon has been effected for thermic purposes. At a temperature of 1650° C. the reduction of chromic oxide can be initiated, once initiated the reaction proceeds exothermically. When the reduction of the chromium has been completed, the metal bath may be poured off and transferred to a basic electric furnace for final refining in the usual manner.

The reduction product in the converter, especially if silicon has been added to the bath for thermic purposes, will contain 1% or more of residual silicon. I consider this to be advantageous in that the presence of silicon tends to protect the chromium from re-oxidation during its transfer to the refining furnace. It is of advantage to add to the slag substantially more than the theoretical requirement of ferro silicon so as to effect a complete reduction of the chromium. This also tends to produce in the reduction product a silicon content higher than that desired in the final alloy steel, but which may be conveniently removed in the refining furnace above referred to.

In the example cited to illustrate this process, I have selected a silicon alloy as a suitable reducing agent in preference to one of a carbonaceous character. My reason for this is to avoid the introduction of carbon in the bath when a low carbon chrome steel is the final product desired. A further advantage in the use of silicon is to be found in the strongly exothermic reaction of the silicon reducer, which enables the reduction of the chromium to be effected with but little, or no extraneous heat. It will, however, be obvious to those skilled in the art that this invention is equally applicable in a case where carbon is used as a reducing agent for the chromium contained in the slag; it will also be evident that if carbon be used, the heat requirements of reduction must be met by the use of an oil fired converter. While I have given as an illustrative example a chromiferous pig iron containing 2-4% of chromium, I do not desire to be limited thereto. The process herein disclosed is susceptible of application to any blast furnace iron product containing as a constituent in any proportions, chromium or other alloying elements, separable from the iron by oxidation in a converter.

The invention as above set forth is susceptible of various modifications and changes without departing from the spirit thereof, and I desire, therefore, that only such limitations shall be placed thereupon as are imposed by the prior art, or as are specifically set forth in the appended claims.

Having thus described my invention what I claim as new and desire to secure by Letters Patent is:

1. In combination with a method for the pyro-metallurgical treatment of chromiferous iron ores including a blast furnace reduction, a pneumatic conversion in an acid furnace, and a refining operation in an open hearth furnace for the manufacture of steel, the process which consists in retaining in the converter the chromiferous slag together with a portion of the blown metal, adding a reducing agent of exothermic character to the slag to reduce the chromium and the iron contained therein, discarding the final slag, and refining the bath of chromiferous steel in an electric furnace, whereby a low-carbon low-silicon chrome steel may be obtained as a by-product of the aforesaid pyro-metallurgical treatment.

2. In combination with a method for the pyro-metallurgical treatment of chromiferous iron ores including a blast furnace reduction, a pneumatic conversion in an acid furnace, and a refining operation in an open hearth furnace for the manufacture of steel, the process which consists in retaining in the converter the chromiferous slag together with a portion of the blown steel, heating the mass to a temperature suitable for the reduction of the chromium, adding a reducing agent to the slag to reduce the chromium and the iron contained therein, discarding the final slag, and refining the bath of chromiferous steel in an electric furnace, whereby a low-carbon low-silicon chrome steel may be obtained as a by-product of the aforesaid pyro-metallurgical treatment.

3. In combination with a method for the pyro-metallurgical treatment of chromiferous iron ores including a blast furnace reduction, a pneumatic conversion in an acid furnace, and a refining operation in an open hearth furnace for the manufacture of steel, the process which consists in, retaining in the converter the chromiferous slag together with a portion of the blown steel, adding thereto an oxidizable reagent of strongly exothermic character, submitting the mass to an afterblow to oxidize the reagent, thereby raising the temperature of the mass to a degree suitable for the reduction of the chromium, adding a suitable reducing agent to the slag to reduce the chromium and the iron contained therein, discarding the final slag, and refining the bath of chromiferous steel in an electric furnace, whereby a low-carbon low-silicon chrome steel may be obtained as a by-product of the aforesaid pyro-metallurgical treatment.

4. In combination with a method for the pyro-metallurgical treatment of chromiferous iron ores including a blast furnace reduction, a pneumatic conversion in an acid furnace, and a refining operation in an open hearth furnace for the manufacture of steel, the process which consists in, retaining in the converter the chromiferous slag together with a portion of the blown steel, adding thereto an oxidizable reagent of strongly exothermic character submitting the mass to an afterblow to oxidize the reagent, thereby raising the temperature of the mass to a degree suitable for the reduction of the chromium, adding a suitable reducing agent to the slag to reduce the chromium and the iron contained therein, and discarding the slag, whereby a bath of chrome steel may be obtained in the converter.

5. A process for the concentration of an alloying element associated in small proportions with an iron ore which consists in, reducing the ore so as to obtain a reduction product containing the alloying element as an impurity, oxidizing said alloying element from the molten reduction product into a supernatant slag, separating the major portion of the molten reduction product for the normal manufacture of steel, retaining the remainder of the molten product and the supernatant slag, and transferring the alloying element from the slag to the remainder of the molten product by adding a suitable reducing agent to the former, so as to effect a suitable concentration of said alloying element in the latter.

In testimony whereof I hereunto affix my signature.

PERCY G. PARIS.

CERTIFICATE OF CORRECTION.

Patent No. 1,768,710.     Granted July 1, 1930, to

PERCY G. PARIS.

It is hereby certified that error appears in the printed specification of the above numbered patent requiring correction as follows: Page 2, line 21, for ".90%" read .09%; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.

product containing the alloying element as an impurity, oxidizing said alloying element from the molten reduction product into a supernatant slag, separating the major portion of the molten reduction product for the normal manufacture of steel, retaining the remainder of the molten product and the supernatant slag, and transferring the alloying element from the slag to the remainder of the molten product by adding a suitable reducing agent to the former, so as to effect a suitable concentration of said alloying element in the latter.

In testimony whereof I hereunto affix my signature.

PERCY G. PARIS.

CERTIFICATE OF CORRECTION.

Patent No. 1,768,710.    Granted July 1, 1930, to

PERCY G. PARIS.

It is hereby certified that error appears in the printed specification of the above numbered patent requiring correction as follows: Page 2, line 21, for ".90%" read .09%; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.